United States Patent [19]

Masuda et al.

[11] Patent Number: 4,647,822

[45] Date of Patent: Mar. 3, 1987

[54] TELEVISION CAMERA

[75] Inventors: Yukihiro Masuda, Kodaira; Shizuka Ishibashi, Musashimurayama; Kenji Takahashi, Kanagawa; Takuma Kodama, Kokubunji; Koji Kudo, Hachioji; Masanori Hombough, Mitaka, all of Japan

[73] Assignees: Hitachi, Ltd.; Hitachi Denshi Kabushiki Kaisha, both of Tokyo, Japan

[21] Appl. No.: 638,267

[22] Filed: Aug. 6, 1984

[30] Foreign Application Priority Data

Sep. 9, 1983 [JP] Japan .................................. 58-165016

[51] Int. Cl.[4] .......................................... H01J 29/52
[52] U.S. Cl. .................................... 315/386; 315/383; 315/371; 358/219
[58] Field of Search ............... 315/382, 383, 386, 371; 358/219

[56] References Cited

U.S. PATENT DOCUMENTS

| 4,039,899 | 8/1977 | Battjes et al. | 315/382 |
| 4,104,566 | 8/1978 | Shah | 315/371 |
| 4,258,298 | 3/1981 | Hilburn et al. | 315/382 |

Primary Examiner—Theodore M. Blum
Attorney, Agent, or Firm—Antonelli, Terry & Wands

[57] ABSTRACT

A television camera capable of correcting shadings caused by digital registration faculty employed in a multi-tube type color television camera. The television camera comprises differentiating circuits for generating differentiated waves of correction waveforms used for adjusting registration, and non-linear circuits for processing the differentiated waves. Outputs of the non-linear circuits control the gain of a video signal circuit so that components responsible for the generation of shadings can be removed from a video signal.

11 Claims, 25 Drawing Figures

TELEVISION CAMERA

The present invention relates to a television camera and more particularly to a circuit arrangement for correcting a shading which is attendent on the digital registration to be effected in a television camera using a plurality of image pick-up tubes, for example, a three-tube type color television camera.

Conventionally, in an application such as broadcasting services requiring high quality of pictures, a multi-tube type color television camera using a plurality of image pick-up tubes has been employed. Especially, the principal use has been directed to a three-tube type color television camera in which input light is separated into three primary colors and image pick-up tubes are provided corresponding to the respective colors. In the multi-tube type color television camera, various kinds of geometric distortions occur which are due to electro-optical distortions inherent to the type of deflection system and related to errors in the respective image pick-up tubes including an error in manufacturing the electron gun, a fabrication error of the deflection coil assembly or both. Since these geometric distortions are of different characteristics depending on the respective image pick-up tubes, images produced from the respective image pick-up tubes tend to displace from each other. Therefore, in order to attain a correct registration among three pictures, the geometric distortions of the respective image pick-up tubes must be corrected. A manner to effect the registration adjustment will be described below.

In the television camera with image pick-up tubes, an electron beam is deflected so as to be scanned on a photoconductive target of an image pick-up tube so that electric charges stored in the target are read by the scanning electron beam to produce electrical signals. For deflection of the electron beam, there are available electrostatic deflection and electromagnetic deflection. Either voltage or current in the form of a saw-tooth wave called a deflection wave as shown in FIG. 1 is used to generate either an electric field for electrostatic deflection or a magnetic field for electromagnetic deflection. In either type of deflection, the electron beam is deflected by the deflection wave along a scanning line 1 as shown in FIG. 2 which forms a scanning area 2. Deflection is effected in horizontal and vertical directions to provide horizontal deflection and vertical deflection. The horizontal deflection is synchronous with the vertical deflection and hence, as shown in FIG. 2, the electron beam is repetitiously scanned along the same scanning line. Since the position of the electron beam is determined by the deflection waveform during scanning, the geometric distortion of each of the image pick-up tubes can be corrected by changing the deflection waveform to attain the registration adjustment of the respective image pick-up tubes.

To change the deflection, a predetermined waveform synchornous with the deflection waveform (sawtooth waveform) is typically superimposed thereon. The predetermined waveform simulates amounts of movement of the electron beam necessary for correcting the distortion and is hereinafter referred to as correction waveform.

In recent years, a digital registration method has been used wherein a correction waveform is generated on the basis of correction data of digital values stored in a digital memory. Thus, the registration adjustment will be described below by referring to an example of the digital registration method.

In accordance with the digital registration method, the screen of television (the scanning area of the target) is divided into a number of regions in the horizontal and vertical directions, and independent registration adjustment is effected in the horizontal and vertical directions within each region. Necessary digital data for correction has previously been stored in the digital memory corresponding to a central point (lattice point) 3 of each of the regions. The digital data is read in synchronism with the scanning and converted into an analog signal which provides a correction waveform. FIG. 4 shows, in block diagram, a circuit arrangement for the digital registration. A pulse signal in synchronism with the scanning is produced from a sync signal generator 4 and sent to an address counter 11 to cause it to select an address of a digital memory 9. Since addresses of the digital memory 9 are assigned to the respective regions, the digital data is read in synchronism with the scanning. The read digital data is converted by a D/A converter 8 into an analog signal which in turn is passed through a smoothing circuit 7 to provide a smoothed correction waveform. This correction waveform is superimposed on the deflection waveform (produced from a deflection waveform generator 5) by means of an adder circuit 6 and sent to a deflection coil drive circuit 10. The deflection coil drive circuit 10 passes a current proportional to the deflection wave through a deflection coil 12 and consequently, the electron beam travelling within an image pick-up tube 13 is deflected to a desired position. In this manner, distortion of each of the image pick-up tubes is corrected for registration adjustment. The correction data is, however, provided for only one point within each region, and preparation of correction data is required for the remaining points. To this end, interpolation is effected as will be described below. For horizontal correction, the D/A converter produces a correction waveform containing amounts of correction 14 at the correction points as shown in FIG. 5a. Pursuant to the sampling theorem, this correction waveform is passed through a low-pass filter having a cut-off frequency of ½ or less of a sampling frequency to provide a smoothed continuous correction waveform as shown in FIG. 5b. Thus, for the horizontal correction, the correction data necessary for points other than the correction points is prepared by means of the low-pass filter in this manner. For vertical correction, however, a low-pass filter cannot be used for smoothing since correction points in the vertical direction are time discrete on account of the scanning line structure. Therefore, correction values between the vertical correction data are typically obtained by using a linear interpolation method based on the simplest form of a straight line for interpolation and an analog smoothing method in combination. To explain the linear interpolation, reference should be made to FIGS. 6a and 6b. In FIG. 6a illustrating a portion of the television screen, a group of scanning lines 15 is represented by a group of lateral lines, and the amount of correction, the horizontal direction and the vertical direction are represented by axes 28, 29 and 30, respectively. Exemplarily, for simplicity of explanation, scanning lines 16, 17 and 18 are assumed to be associated with the correction data, the number of scanning lines to be interpolated between each of the scanning lines 16 and 18 and the scanning line 17 is three, and among correction points 19 to 27, only the correction point 23 is subjected to correction by an amount illustrated by an arrow. Under this condition, the correction waveforms for horizontal correction and produced from the correction data for the scanning lines 16, 17 and 18 and smoothed into continuous waveforms by means of the low-pass filter as described previously. Correction values on the respective scanning lines along a line A—A' connecting the correction points 20, 23 and 26 at the same horizontal position change linearly as shown at a thick line in FIG. 6a. In other words, these vertical correction values are distributed on the line A—A' as shown in FIG. 6b where ordinate represents the amount of correction. At horizontal positions deviated from the line A—A', correction values between the scanning lines associated with the correction data can be obtained in a similar manner by linear interpolation utilizing the smoothed correction waveforms for the scanning lines associated with the correction data. When denoting by $x_1$ a particular vertical correction data present at a horizontal position on a preceding scanning line associated with correction data and denoting by $x_2$ a particular vertical correction data present at the same horizontal position on a succeeding scanning line associated with correction data, an amount of correction $x_i$ at the same horizontal position as the correction data $x_1$ and $x_2$ on an i-th scanning line counted from the preceding scanning line is written as, $$x_i = x_1 + \frac{x_2 - x_1}{n} \cdot i \quad (1)$$

where n is the number of scanning lines between the preceding and succeeding scanning lines with correction data. The thus interpolated correction data is indicated by linear equation and this interpolation is called linear approximate interpolation. When the vertical correction waveforms obtained from the interpolation as shown in FIG. 6a are superimposed on the deflection wave, the electron beam is scanned on a photoconductive target 31 of an image pick-up tube to trace solid lines as shown in FIG. 7 (dotted lines represent positions of the scanning lines without superimposed correction waveforms). Under the application of the linear interpolation, the spacing between scanning lines at a horizontal position is constant between the preceding and succeeding scanning lines associated with the correction data. For example, in FIG. 7, the scanning line spacing at a horizontal position on line B—B' is constant between the scanning lines 16 and 17. This holds true between the scanning lines 17 and 18.

However, when effecting the geometric distortion correction, the speed of the electron beam for reading the electric charges is changed in the horizontal direction and the scanning line spacing (scanning line density) is changed in the vertical direction with the result that the output signal of the image pick-up tube is changed. The horizontal correction waveform is smoothed by the low-pass filter to smooth the change of the output signal and hence, no serious problem is raised. However, the linear approximate correction data in the vertical direction causes the output signal to change rapidly at the boundary of the scanning line associated with the correction data. FIG. 8 shows the profile of the output signal after the correction shown in FIG. 6a. In FIG. 8, the output signal amount of the image pick-up tube is represented by an axis 32 and, as in FIG. 6a, the horizontal and vertical directions are represented by axes 29 and 30, respectively. As will be seen from the figure, the output signal is changed rapidly at the boundary of the scanning lines 16, 17 and 18 associated with the correction data.

When the profile of the output signal in FIG. 8 is sectioned on a thick solid line, a waveform as shown in FIG. 9 results.

Such a change in the output signal leads to luminance non-uniformity called shading appearing on a monitor screen which is very conspicuous for the human eyesight. In the case of the three-tube type color television camera, an output change results in a color shading which prevents reproduction of uniform color on the screen.

Under the application of the linear interpolation, the shading is caused at the boundary of the scanning line associated with the correction data as described above. To eliminate the rapid change in the output signal amount, an analog smoothing method to be described below has been proposed. FIG. 10 shows, in block diagram, a smoothing circuit in accordance with the analog smoothing method.

Referring to FIG. 10, a signal read on time series is sent by an analog demultiplexer 33 to a group of low-pass filters 34 allotted to the respective regions in the horizontal direction. The low-pass filter is adapted to effect vertical smoothing at each of the divisional regions in the horizontal direction and therefore it has a cut-off frequency equal to half a frequency which is a multiple of the vertical scanning frequency by the number of divisions in the vertical direction. Outputs of the group of low-pass filters 34 are switched by an analog multiplexer 35 in synchronism with the television scanning and each output of the multiplexer 35 is passed through a horizontal low-pass filter 36 to provide a distortion correction waveform. With this method, the correction waveform can be smoothed in the vertical direction as in the horizontal direction, thereby eliminating the rapid change in the output signal.

When the same one correction point in the vertical direction as that in the linear interpolation method is corrected in accordance with the analog smoothing method, resulting correction as shown in FIG. 11a is obtained. Correction value distribution on line A—A' is depicted in FIG. 11b. Changes in the output signal are shown in FIG. 12a and a profile sectioned on line B—B' is illustrated in FIG. 12b. As will be seen from FIGS. 12a and 12b, the vertical smoothing by the low-pass filter can suppress the rapid change in the output signal at the boundary of the scanning line associated with the correction data.

Even with the analog smoothing method, however, shading still takes place when the amount of correction for digital registration is large, limiting the correction amount to small values.

An object of this invention is to provide a television camera capable of reducing the shading.

To accomplish the above object, according to this invention, there is provided a television camera comprising:

a plurality of image pick-up tubes;

deflection means provided on each of the image pick-up tubes, for deflecting an electron beam travelling within each image pick-up tube;

means generating deflection waveforms which periodically deflect the electron beam within the image pick-up tube, for scanning the electron beam;

means generating correction waveforms applied to the scanning of the electron beam within at least one of the plurality of image pick-up tubes, for adjusting registration of a plurality of images produced from the plurality of image pick-up tubes;

means for generating composite waveforms of the deflection waveforms and the correction waveforms;

means for supplying deflection waves based on the composite waveforms to the deflection means of at least the one of the plurality of image pick-up tubes;

differentiating circuit means for generating differentiated waves of the correction waveforms;

non-linear circuit means for processing the differentiated waves; and variable gain circuits supplied with a video signal delivered out of the image pick-up tube whose deflection means is driven by receiving the deflection waves based on the composite waveforms and having their gain controlled by output waves of the non-linear circuit means so as to control the amplitude of the video signal.

Figure 1:
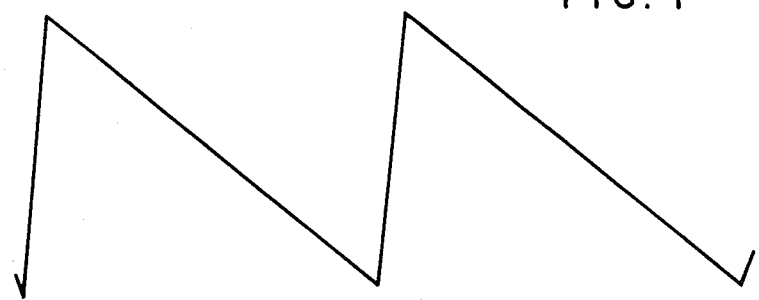
FIG. 1 shows a deflection waveform.
Figure 2:
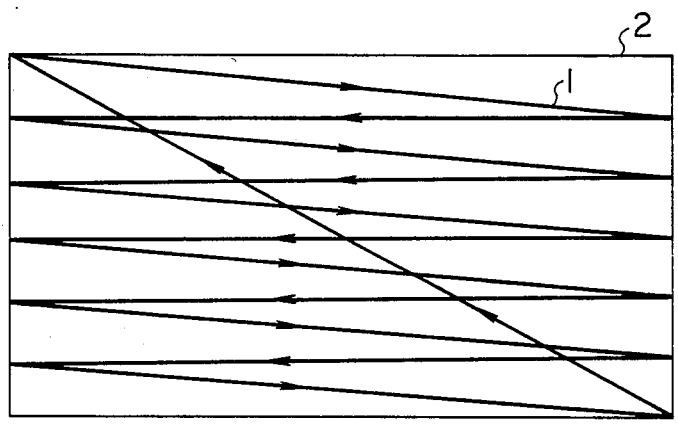
FIG. 2 shows a scanning area of an electron beam.
Figure 3:
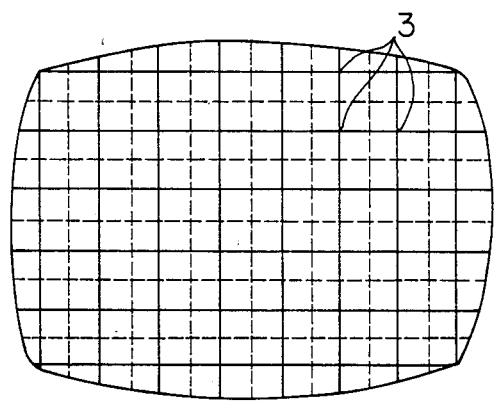
Figure 4:
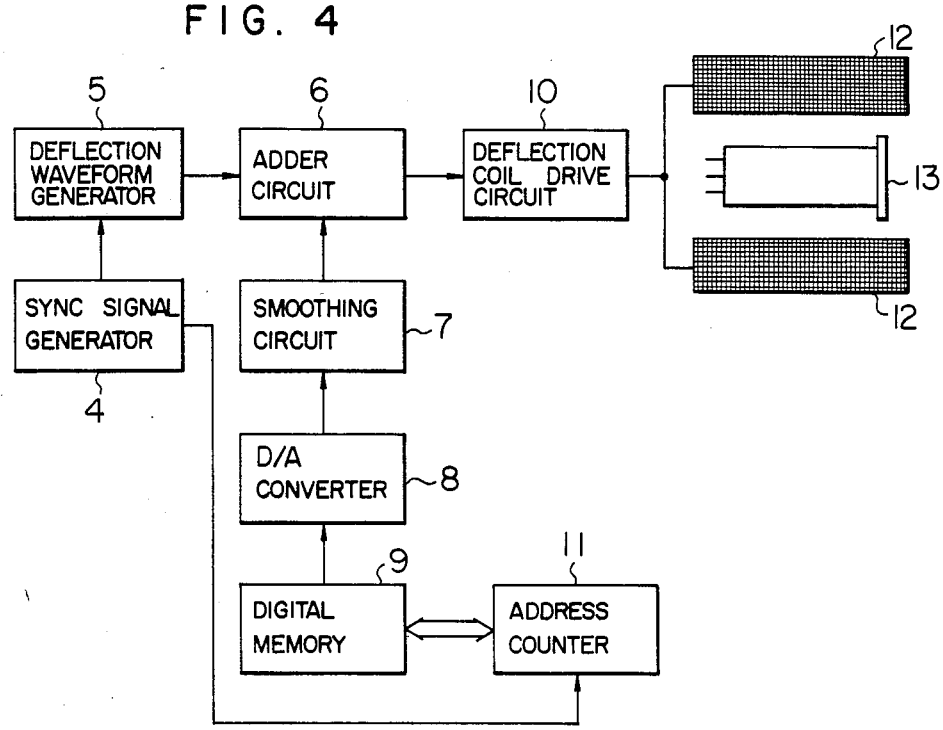
Figure 5A:
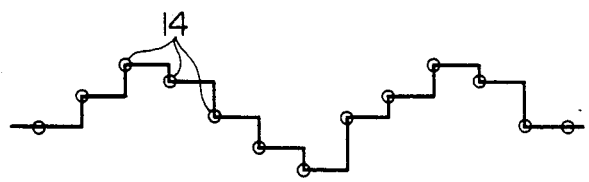
Figure 5B:
Figure 6A:
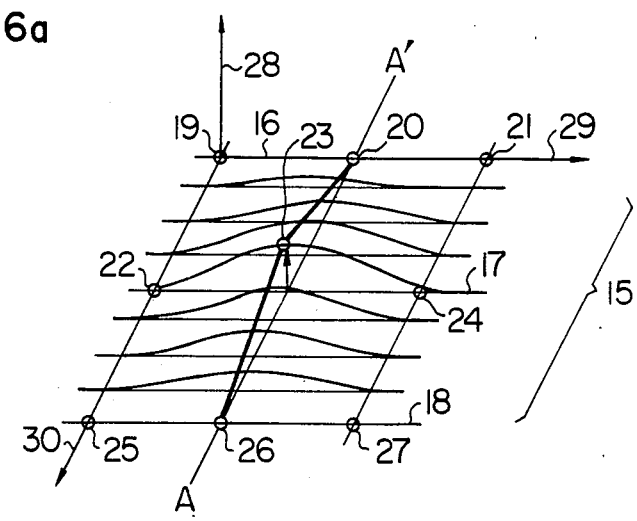
Figure 6B:
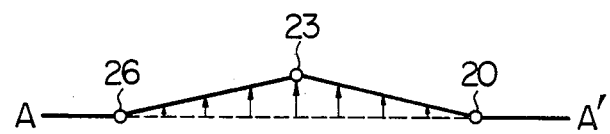
Figure 7:
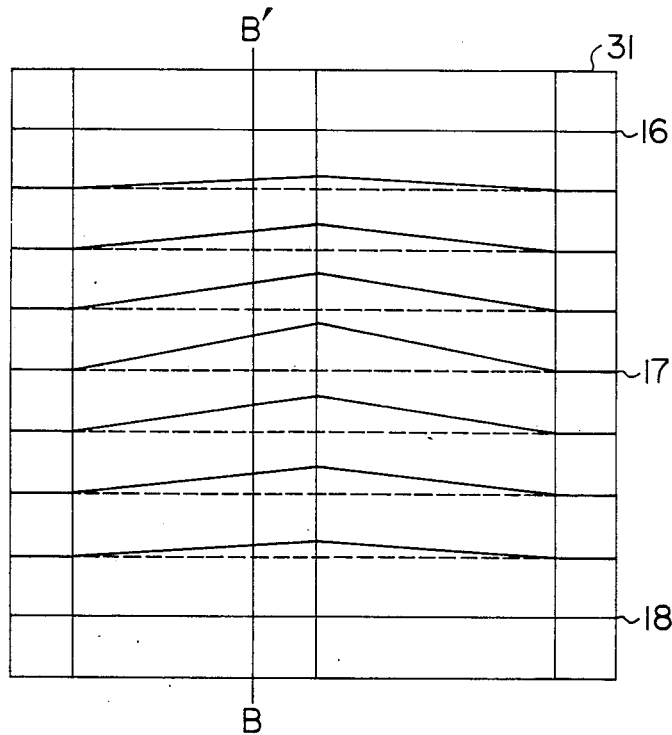
Figure 8:
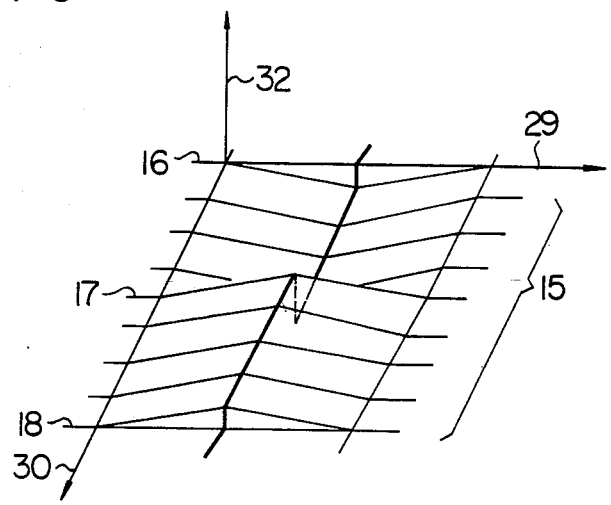
Figure 9:
Figure 10:
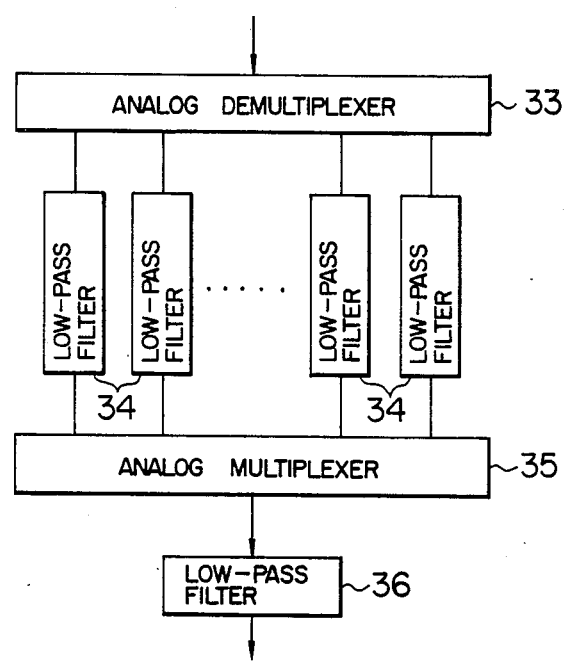
Figure 11A:
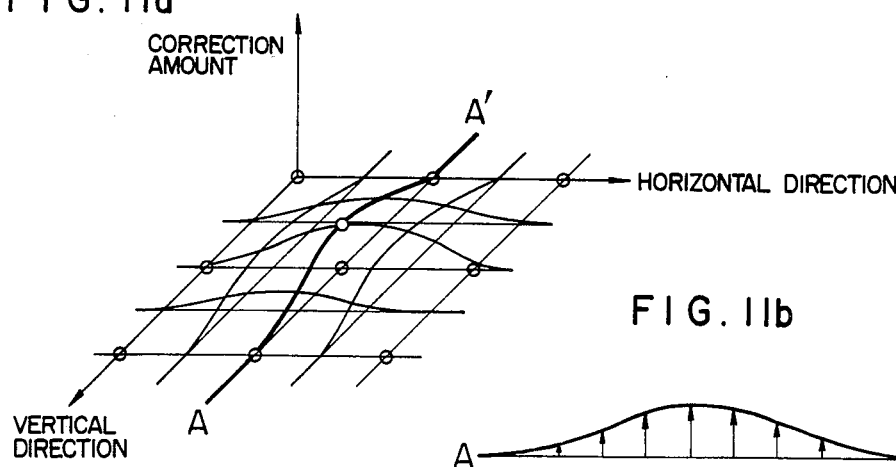
Figure 11B:
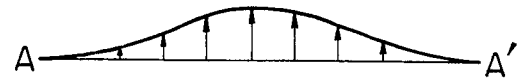
Figure 12A:
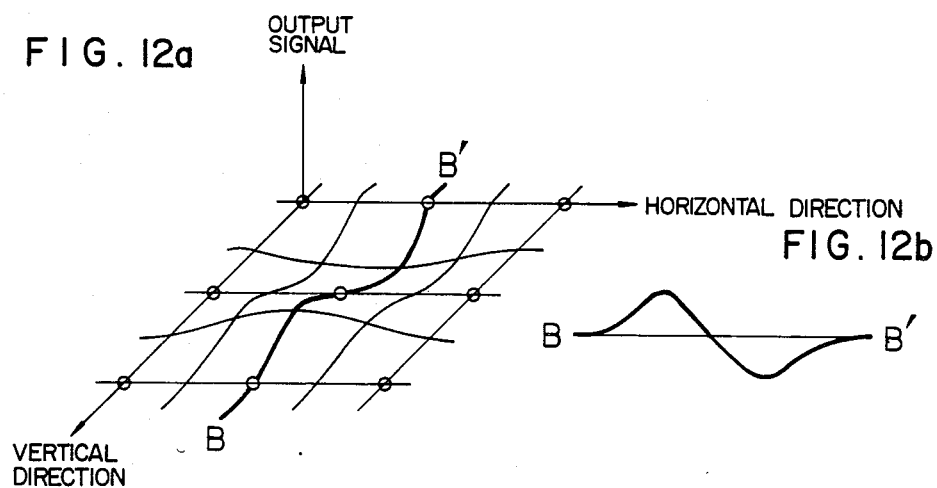
Figure 12B:
Figure 13:
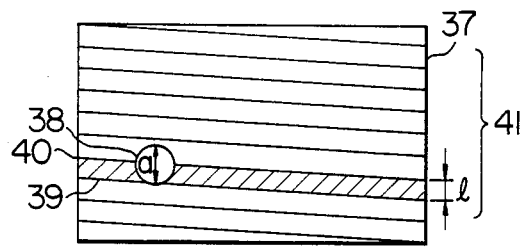
Figure 14:
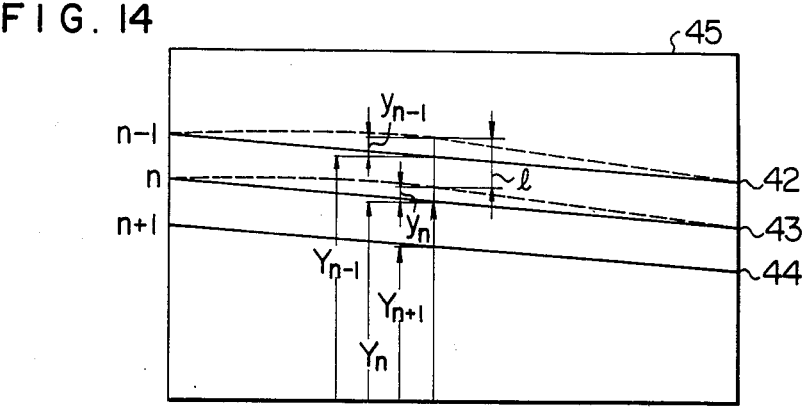
Figure 16A:
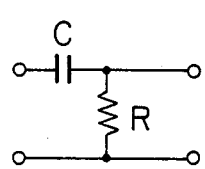
Figure 16B:
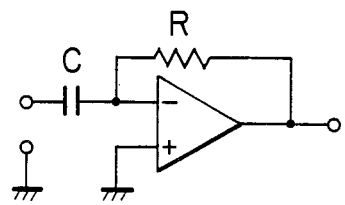
Figure 17:
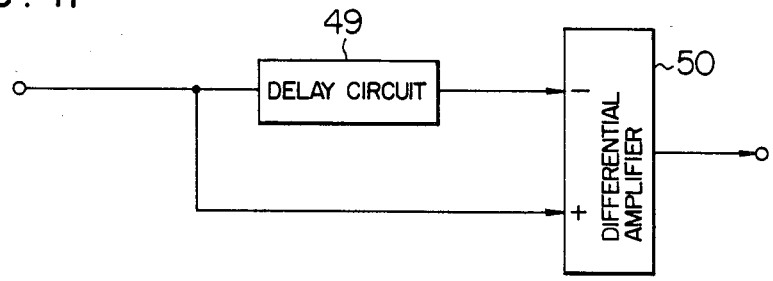
Figure 19:
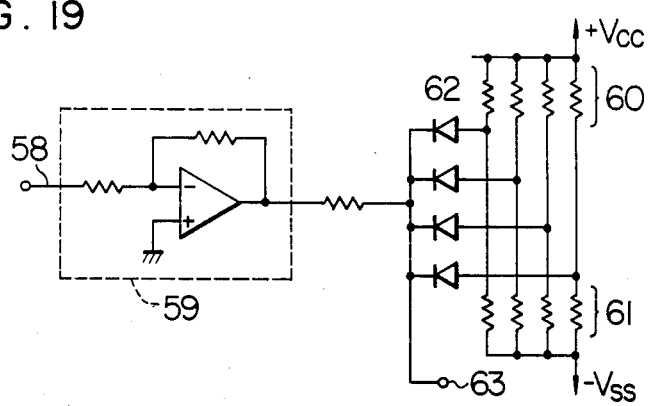
Figure 15:
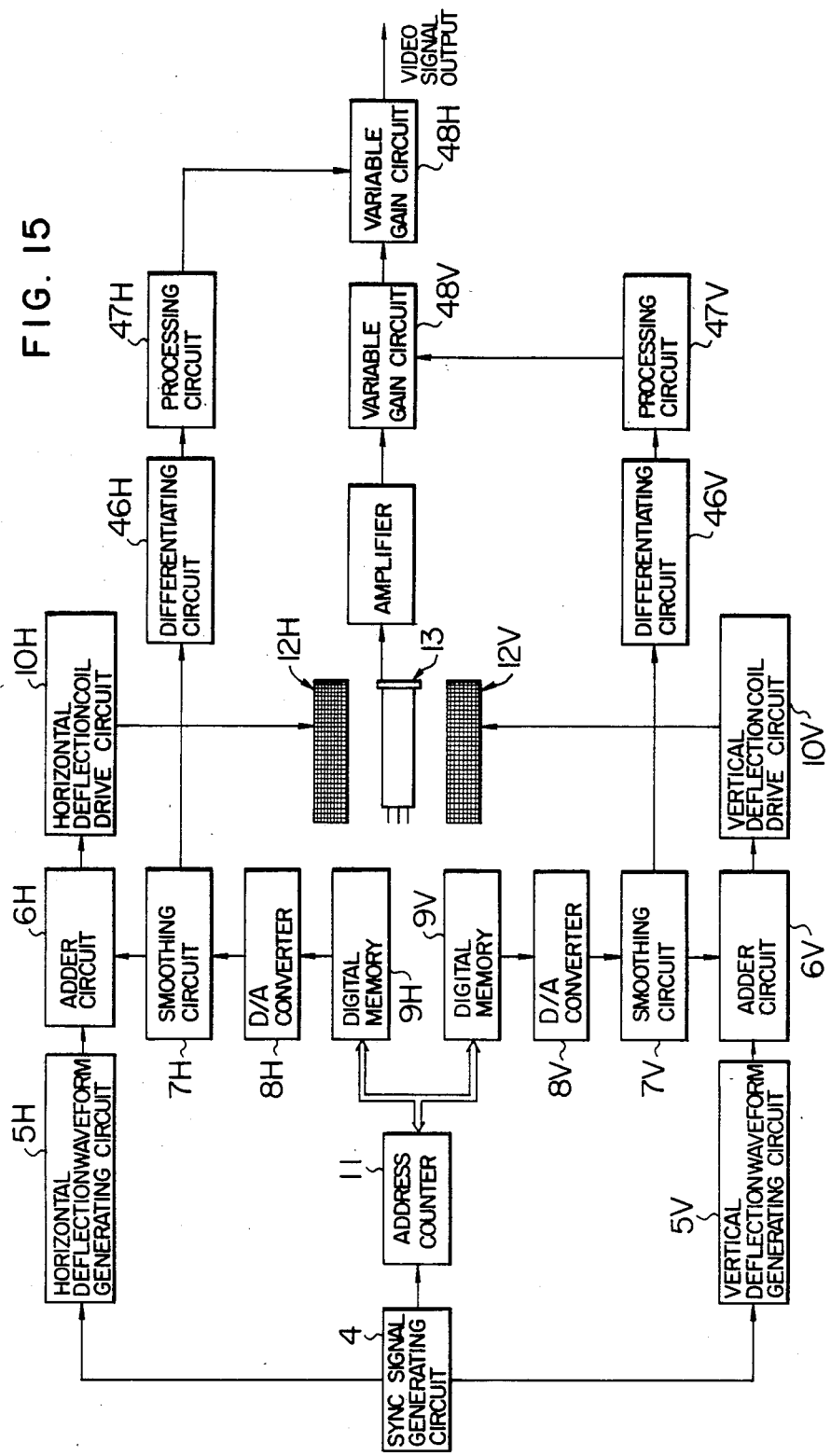
Figure 18:
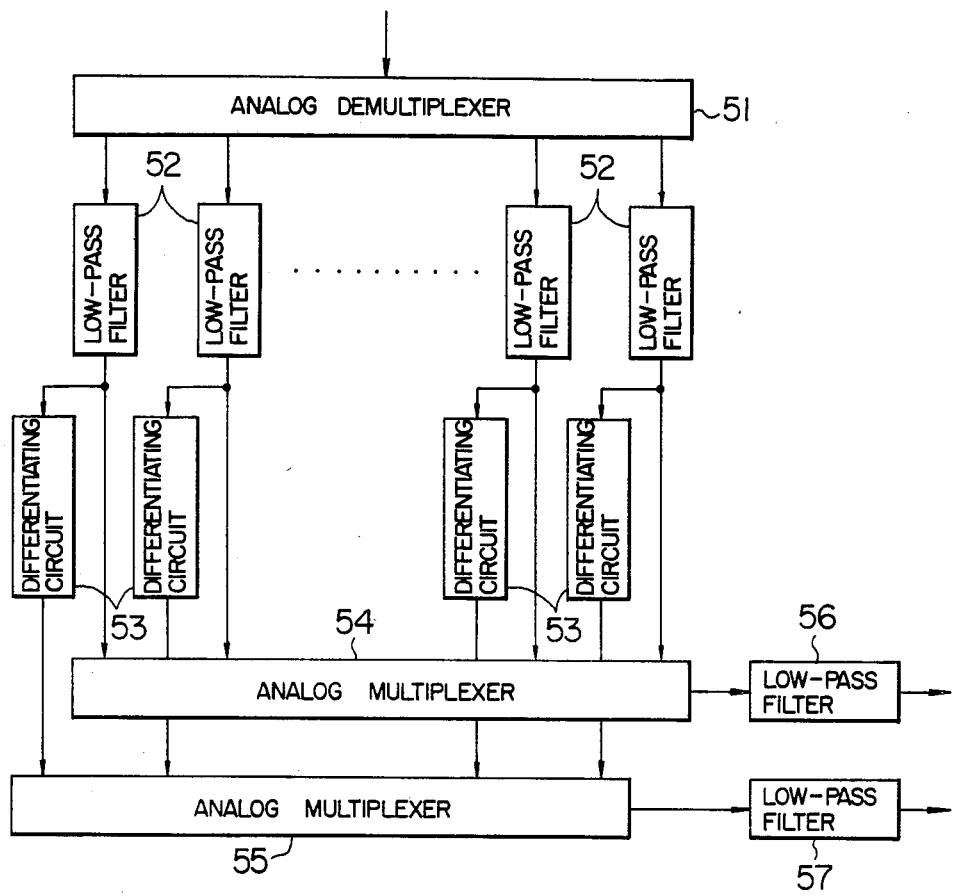
Figure 20:
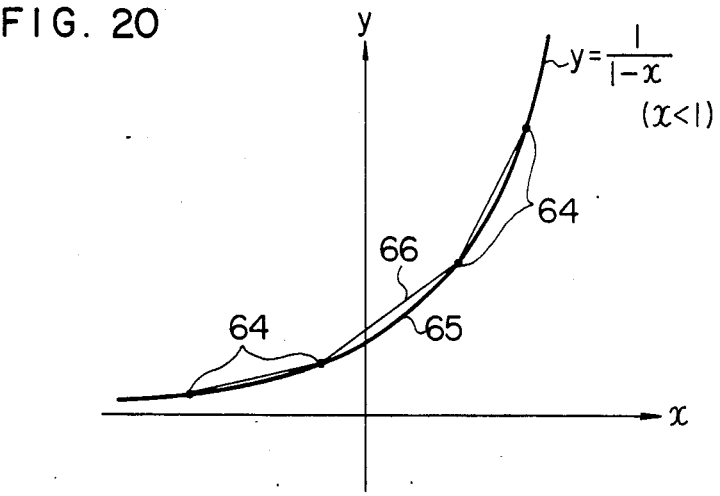

FIGS. 3 to 9 are illustrative of digital registration, of which FIG. 3 is a diagram for explaining division of the scanning area shown in FIG. 2, FIG. 4 is a block diagram of a circuit arrangement in accordance with a digital registration method, FIGS. 5a and 5b are diagrams showing correction waveforms in the horizontal direction, FIGS. 6a and 6b are diagrams for explaining interpolation in the vertical direction based on linear interpolation, FIG. 7 is a diagram showing a target of an image pick-up tube scanned with an electron beam, and FIGS. 8 and 9 are diagrams for explaining the amount of an output video signal resulting from the correction shown in FIGS. 6a and 6b;

FIG. 10 is a block diagram of a circuit in accordance with an analog smoothing method;

FIGS. 11a and 11b are diagrams for explaining smoothed correction in the horizontal and vertical directions;

FIGS. 12a and 12b are diagrams showing the amount of an output video signal resulting from the correction shown in FIGS. 11a and 11b;

FIG. 13 is a diagram for explaining the scanning of an electron beam on a target of an image pick-up tube;

FIG. 14 is a diagram for explaining the scanning line spacing on the target of image pick-up tube;

FIG. 15 is a partial block diagram of a television camera according to one embodiment of the present invention;

FIGS. 16a and 16b show two exemplary differentiating circuits;

FIG. 17 is a block diagram of another example of differentiating circuit;

FIG. 18 is a block diagram showing smoothing circuits and differentiating circuits in accordance with an analog smoothing method;

FIG. 19 is a circuit diagram showing an example of a non-linear processing circuit; and FIG. 20 is a graph showing an input/output characteristic of the processing circuit of FIG. 19.

Before describing a preferred embodiment of the present invention, a detailed explanation on the principle of this invention will first be given. When electric charges stored in the photoconductive target are discharged by the scanning of the electron beam, signal currents are generated. Accordingly, the greater the amount of electric charge discharged by the electron beam, the greater the output current becomes. Referring now to FIG. 13, the generation mechanism of shading will be described. In FIG. 13, an electron beam 38 is scanned on a photoconductive target 37 of an image pick-up tube from left to right, a group of lateral lines 41 are representative of scanning lines, and the electron beam 38 is assumed to be cylindrical, neglecting its actual spreading for simplicity of explanation, so as to have a diameter which is larger than a spacing between adjacent scanning lines. Since the electric charge on the photoconductive target is read by the electron beam, the amount of output signal current read by the electron beam scanned along a scanning line 39 corresponds to the amount of electric charge discharged from an area defined by the scanning line 39 and a preceding scanning line 40. As described previously, when the correction is effected, the scanning speed is changed in the horizontal direction and the scanning line density is changed in the vertical direction and as a result, the shading takes place. A quantitative analysis of this phenomenon will be given as follows. Denoting an electric charge stored in the photoconductive target by Q, an output current $I_s$ for the signal electric charge is expressed as $$I_S = dQ/dt \qquad (2)$$

Assuming now that light is radiated uniformly on the photoconductive target, an electric change $Q_0$ per unit area is uniform over the entire photoconductive target and an amount of electric charge read at the rate of a unit of time may be written as $$dQ = l \cdot v \cdot Q_0 \, dt \qquad (3)$$

where l represents the scanning line spacing and v the scanning speed of electron beam. By inserting the equation (3) in the equation (2), there results $$I_S = l \cdot v \cdot Q_0 \qquad (4)$$

The equation (4) indicates that the output signal current produced from the photoconductive target is proportional to l and v if $Q_0$ is constant.

The position of the electron beam on the photoconductive target is determined by magnitudes of the horizontal and vertical deflection waveforms.

Considering the horizontal correction, the position of the electron beam is so changed as to correct the horizontal distortion and the scanning speed of the electron beam is changed to $$v_C = dx/dt \qquad (5)$$

where x represents a shift of the electron beam caused by applying the correction waveform. Since x is in proportion to the correction waveform, the equation (5) may be written in the form $$v_C = a_H \cdot \frac{de_H}{dt} \qquad (6)$$

where $a_H$ is a constant and $e_H$ is a horizontal correction voltage (or correction current). The deflection waveform is a saw-tooth waveform as described previously and consequently, the electron beam moves at a constant speed. Then, by denoting the constant speed of the electron beam by $v_0$, output current $I_{SCH}$ after the correction is given by $$I_{SCH} = Q_0 \cdot l \cdot v_0 + Q_0 \cdot l \cdot a_H \frac{de_H}{dt} \qquad (7)$$

$$= I_S + I_{CH} \qquad (8)$$

where $I_S = Q_0 \cdot l \cdot v_0$ and $I_{CH} = Q_0 \cdot l \cdot a_H \frac{de_H}{dt}$.

In the absence of the correction, the output signal corresponds to $I_S$ and under the application of the correction, an unwanted signal corresponding to $I_{CH}$ appears, leading to a shading. It will be seen from the equation (7) that the amount of the shading is proportional to the differentiated correction waveform.

To explain the vertical correction, reference should be made to FIG. 14. In the absence of the correction, (n−1)-th, n-th and (n+1)-th scanning lines 42, 43 and 44 take the form of solid lines as shown in FIG. 14. Under this condition, the output current is given by the equation (4). Since the scanning line spacing l in the equation (4) is defined to designate a spacing between a particular scanning line and a scanning line preceding it, the output signal current, $I_{SCV}$, when the scanning lines 42 and 43 shift to those illustrated at dotted lines in FIG. 14 is given by $$I_{SCV} = Q_0 v \{(Y_{n-1} + y_{n-1}) - (Y_n + y_n)\} \qquad (9)$$
$$= Q_0 v (Y_{n-1} - Y_n) + Q_0 v (y_{n-1} - y_n) \qquad (10)$$

where Y and y represent the position and shift of the electron beam on the photoconductive target 45, respectively, and their values are proportional to the deflection waveform and the correction waveform, respectively. Then, letting $(y_{n-1} - y_n)$ be $a_V(e_{n-1} - e_n)$, $(Y_{n-1} - Y_n) = 1$ stands and there results $$I_{SCV} = Q_0 \cdot l \cdot v_0 + Q_0 \cdot v \cdot a_V (e_{n-1} - e_n) \qquad (11)$$

$$I_{SCV} = I_S + I_{CV} \qquad (12)$$

where $a_V$ is a proportional constant, $I_S = l \cdot v_0 \cdot Q_0$ and $I_{CV} = Q_0 \cdot v \cdot a_V (e_{n-1} - e_n)$. It will be seen from the equation (11) that an unwanted output signal corresponding to $I_{CV}$ caused by the vertical correction is in proportion to a difference between a correction value for the particular scanning line and a correction value for the scanning line preceding it. This unwanted output signal results in a shading.

As described above, when the speed of the electron beam and the scanning line spacing are changed for correcting the distortions, non-uniformity of the output signals responsible for shadings takes place.

The shading can be corrected by a variable gain circuit which manages the following relation between input signal $x_i$ and output signal $x_o$:

$$x_o = K \cdot x_i \qquad (13).$$

By changing the proportional constant K in the equation (13), the gain, $x_o/x_i$, can be controlled. The unwanted signal $I_C$ due to the distortion correction is superimposed on the signal waveform $I_S$ which is not subjected to the distortion correction. To cancel out the signal $I_C$, the relation between $I_S$ and $I_C$ as expressed by $$I_S = K (I_S + I_C) \qquad (14)$$

may be derived from the equation (13) and then, the gain K may be $$K = \frac{I_S}{I_S + I_C} \qquad (15)$$

$$= \frac{1}{1 + \frac{I_C}{I_S}} \qquad (16)$$

$$= \frac{1}{1 + I} \qquad (17)$$

where $I = I_C/I_S$.

For the horizontal correction, $$I = I_{CH}/I_S.$$

From the equation (8), $$I = \frac{I_{CH}}{I_S} \qquad (18)$$

$$= \frac{Q_0 \cdot l \cdot a_H \cdot \frac{de_H}{dt}}{Q_0 \cdot l \cdot v_0}$$

$$= \frac{a_H}{v_0} \cdot \frac{de_H}{dt}.$$

Due to the fact that the deflection waveform is a sawtooth waveform, the speed $v_0$ of the electron beam is constant. Then, by letting $a_H/v_0$ be $a_1$, $$I = a_1 \cdot \frac{de_H}{dt} \qquad (19)$$

stands. By entering the equation (19) in the equation (17), there results $$K = \frac{1}{1 + a_1 \frac{de_H}{dt}} \qquad (20)$$

where $a_1$ is a constant.

For the vertical correction, I in the equation (17) is $I_{CV}/I_S$. Then, from the equation (17), $$I = \frac{I_{CV}}{I_S}$$

$$= \frac{Q_0 \cdot v \cdot a_V (e_{n-1} - e_n)}{Q_0 \cdot l \cdot v_0}.$$

Since v can be regarded as nearly $v_0$, $$I = \frac{a_V(e_{n-1} - e_n)}{l} \qquad (21)$$

then, by letting $a_V/l$ be $a_2$ (constant), $$I = a_2 (e_{n-1} - e_n) \qquad (22)$$

results. By entering the equation (22) in the equation (17), $$K = \frac{1}{1 + a_2(e_{n-1} - e_n)} \qquad (23)$$

is obtained. The above results indicate that the shading can be corrected by so processing the differentiated waves of the horizontal and vertical correction waveforms as to meet the equations (20) and (23) and changing the gain K of the variable gain circuits in accordance with the equations (20) and (23).

FIG. 15 shows, in block form, a circuit arrangement for implementation of this principle wherein the basic circuit construction of the television camera is added with the function to correct the shading.

In synchronism with a sync pulse produced from a sync signal generating circuit 4, a horizontal deflection waveform and a vertical deflection waveform are generated at a horizontal deflection wave generating circuit 5H and a vertical deflection wave generating circuit 5V, respectively.

Amounts of correction of registration for the scanning of the electron beam within an image pick-up tube 13 are stored in digital memories 9H and 9V. Amounts of horizontal correction are stored in the digital memory 9H and amounts of vertical correction are stored in the digital memory 9V. In synchronism with the sync pulse from the sync signal generating circuit 4, an address counter 11 generates address signals which are sent to the memories 9H and 9V, whereby correction data for registration are read out of the memories in synchronism with the scanning. Correction signals read out in the form of digital values are converted into analog signals by D/A converters 8H and 8V. These analog correction signals are respectively passed through a horizontal smoothing circuit 7H and a vertical smoothing circuit 7V so as to be converted into smoothed correction waveforms.

At an adder circuit 6H, the horizontal correction waveform is added to the horizontal deflection waveform and a resulting composite waveform is inputted to a horizontal deflection coil drive circuit 10H. The drive circuit 10H applies a deflection current proportional to the composite waveform to a horizontal drive coil 12H. On the other hand, the vertical correction waveform is added to the vertical deflection waveform at an adder circuit 6V and a resulting composite waveform is applied to a vertical deflection coil drive circuit 10V which in turn passes a deflection current proportional to the composite waveform to a vertical deflection coil 12V.

According to the present invention, the horizontal correction waveform from the smoothing circuit 7H is also sent to a first differentiating circuit 46H, and the vertical correction waveform from the smoothing circuit 7V is also sent to a second differentiating circuit 46V. An output of the differentiating circuit 46H is so processed as to meet the equation (20) by means of a first processing circuit 47H. An output of the differentiating circuit 46V is so processed as to meet the equation (23) by means of a second processing circuit 47V.

Variable gain circuits 48V and 48H are connected in series to a video signal output channel of the image pick-up tube 13. The gain of the circuit 48V is controlled by an output of the processing circuit 47V and the gain of the circuit 48H is controlled by an output of the processing circuit 47H, so that unwanted signals (components responsible for the generation of shadings) contained in a video signal can be cancelled out and a video signal output removed of the shadings can be obtained from an output terminal of the variable gain circuit 48H.

Details of some component circuit blocks in FIG. 15 are as follows. The output waveform of the D/A converter 8H is smoothed by the smoothing circuit 7H in the form of a low-pass filter to form the correction waveform which is received by the horizontal differentiating circuit 46H. Since the correction waveform is continuous in terms of time, it may be directly differentiated by a circuit as shown in FIG. 16a or 16b which stands for the horizontal differentiating circuit.

The vertical differentiating circuit 46V may be implemented by a circuit as shown in FIG. 17 in block form when the linear interpolation method is employed. In this circuit, the input correction waveform is passed through a delay circuit 49 comprising a delay element such as a delay line or a CCD so as to be delayed by one horizontal period, and a difference between a delayed waveform and the input correction waveform is produced from a differential amplifier circuit 50 and used for shading correction. In accordance with the analog smoothing method, the smoothing circuit 7V and the differentiating circuit 46V may be implemented by a circuit as shown in FIG. 18 in block form. In this circuit, an analog demultiplexer 51 sends to low-pass filters 52 signals in synchronism with the divisional regions in the horizontal direction. Outputs of the low-pass filters 52 are sampled by an analog multiplexer 54 and passed through a horizontal low-pass filter 56 to provide the correction waveform. In the case of the analog smoothing method, the circuit adapted to differentiate the correction waveform for shading correction can dispense with the delay circuit of one horizontal period which is required in the case of the linear interpolation method, and the differentiating circuit may be implemented by analog differentiating circuits 53, similar to the horizontal differentiating circuit shown in FIG. 16a or 16b, connected to outputs of the respective low-pass filters 52. An analog multiplexer 55 switches outputs of the analog differentiating circuits 53 in synchronism with the scanning. An output of the analog multiplexer 55 is passed through a low-pass filter 57 having the same cut-off characteristic as that of the low-pass filter 56 adapted to smooth the distortion correction waveform, thereby providing a waveform for shading correction.

Next, one example of the processing circuit will be described.

The processing circuit meeting the equation (17) is considered to be a non-linear circuit. Generally, a circuit based on polygon approximation utilizing diodes is used as the non-linear circuit. However, since it is only a right above increasingly inclined characteristic that can be obtained from this circuit of polygon approximation, the input waveform is inverted to replace the equation (17) with $$y = \frac{1}{1 - x} \qquad (24)$$

and processing is carried out by using the invension A circuit for this processing is exemplified in FIG. 19. The output of the differenting circuit is connected to an input terminal 58 of an inverting circuit 59 comprised of an operational amplfifier which is adapted to invert the input waveform. A voltage difference between constant voltages Vcc and −Vss is divided by sets of resistors 60 and 61, and respective voltage division points are connected with respective cathodes of diodes 62. Under the application of a maximum input voltage, all the diodes are rendered off. As the input voltage decreases until the anode voltage of the respective diodes becomes smaller than the respective divisional voltages, the diodes are sequentially turned on to change the voltage division ratio for the input voltage, thereby establishing a non-linear input/output relationship. An intended processing output can be obtained from an output terminal 63 by setting resistances of the sets of resistors 60 and 61 to suitable values. FIG. 20 shows a polygon approximation curve 66 with polygon points 64 obtained by approximating a curve 65 representative of the equation (21) by means of the circuit of FIG. 19.

As has been described, according to the present invention, the unwanted shading due to the digital registration can be eliminated. Therefore, the amount of correction for digital registration can be increased as compared to that of the conventional method and an image pick-up tube or a coil assembly can be selected from those falling in a wider allowable range to economize the fabrication of television camera and improve efficiency of the fabrication.

We claim:

1. A television camera comprising:
   a plurality of image pick-up tubes;
   deflection means provided on each of the image pick-up tubes, for deflecting an electron beam travelling within each image pick-up tube;
   means generating deflection waveforms for periodically deflecting the electron beam within said image pick-up tube to scan the target of said image pick-up tubes;
   means generating correction waveforms applied to the scanning of the electron beam within at least one of said plurality of image pick-up tubes, for adjusting registration of a plurality of images produced from said plurality of image pick-up tubes;
   means for generating composite waveforms of said deflection waveforms and said correction waveforms;
   means for supplying deflection waves based on said composite waveforms to said deflection means of at least the one of said plurality of image pick-up tubes;
   differentiating circuit means for generating differentiated waves of said correction waveforms;
   non-linear circuit means for processing said differentiated waves; and
   variable gain circuits supplied with a video signal delivered out of said image pick-up tube whose deflection means is driven by receiving said deflection waves based on said composite waveforms and having their gain controlled by output waves of said non-linear circuit means so as to control the amplitude of the video signal.

2. A television camera comprising:
   a plurality of image pick-up tubes;
   a set of horizontal deflection means and vertical deflection means provided on each of the image pick-up tubes, for horizontally and vertically deflecting an electron beam travelling within each image pick-up tube;
   means generating a horizontal deflection waveform for periodically deflecting the electron beam within said image pick-up tube in the horizontal direction for the horizontal scanning;
   means generating a vertical deflection waveform for periodically deflecting the electron beam within said image pick-up tube in the vertical direction for the vertical scanning;
   means generating a correction waveform applied to the horizontal deflection and a correction waveform applied to the vertical deflection of the electron beam within at least one of said plurality of image pick-up tubes, for adjusting registration of a plurality of images produced from said plurality of image pick-up tubes;
   means adding said horizontal deflection waveform and said correction waveform for horizontal deflection, for generating a composite waveform for horizontal deflection;
   means adding said vertical deflection waveform and said correction waveform for vertical deflection, for generating a composite waveform for vertical deflection;
   means for supplying a deflection wave based on said composite waveform for horizontal deflection and a deflection wave based on said composite waveform for vertical deflection to said horizontal deflection means and said vertical deflection means, respectively, of at least the one of said plurality of image pick-up tubes;
   first differentiating circuit means for generating a differentiated wave of said correction waveform for horizontal deflection;
   second differentiating circuit means for generating a differentiated wave of said correction waveform for vertical deflection;
   first non-linear circuit means for processing an output wave of said first differentiating circuit means;
   second non-linear circuit means for processing an output wave of said second differentiating circuit means; and
   a first variable gain circuit and a second variable gain circuit connected thereto in series, said first variable gain circuit being supplied, at its input terminal, with a video signal delivered out of said image pick-up tube whose deflection means is driven by receiving said deflection wave based on said composite waveform, one of said first and second variable gain circuits having its gain controlled by an output wave of said first non-linear circuit means and the other having its gain controlled by an output wave of said second non-linear circuit means.

3. A television camera according to claim 1 wherein said deflection waveform is a current wave proportional to said composite wave, and said deflection means comprises a coil through which said current wave flows.

4. A television camera according to claim 2 wherein said horizontal deflection wave is a current wave proportional to said composite waveform for horizontal deflection and said vertical deflection wave is a current wave proportional to said composite waveform for vertical deflection, and said set of horizontal deflection means and vertical deflection means comprise a coil through which one of said current wave flows and a coil through which the other current wave flows.

5. A television camera according to claim 1 wherein said correction waveform generating means comprises a memory for storing amounts of correction at predetermined positions on an electron beam scanning area of at least one of said plurality of image pick-up tubes, whereby said correction waveform is generated in accordance with an amount of correction read out of said memory in synchronism with scanning of the electron beam.

6. A television camera according to claim 1 wherein said correction waveform generating means comprises a memory for storing, in the form of digital values, amounts of correction at predetermined positions on an electron beam scanning area of at least one of said plurality of image pick-up tubes, a D/A converter for converting an amount of correction read out of said memory in synchronism with scanning of the electron beam into an analog value, and a smoothing circuit for smoothing an analog signal delivered out of said D/A converter, whereby said smoothing circuit provides an output signal serving as said correction waveform.

7. A television camera according to claim 2 wherein said second differentiating circuit comprises a delay circuit for delaying the input correction waveform by one horizontal scanning period, and a differential amplifier for differential amplification of the input correction waveform and a delayed correction waveform delivered out of said delay circuit.

8. A television camera according to claim 1 wherein said non-linear circuit means comprises an inverting circuit, a plurality of resistance-type potential dividers and a plurality of diodes respectively connected to voltage division points of said potential dividers.

9. A television camera according to claim 2 wherein said correction waveform generating means comprises a memory for storing amounts of correction at predetermined positions on an electron beam scanning area of at least one of said plurality of image pick-up tubes, whereby said correction waveform is generated in accordance with an amount of correction read out of said memory in synchronism with scanning of the electron beam.

10. A television camera according to claim 2 wherein said correction waveform generating means comprises a memory for storing, in the form of digital values, amounts of correction at predetermined positions on an electron beam scanning area of at least one of said plurality of image pick-up tubes, a D/A converter for converting an amount of correction read out of said memory in synchronism with scanning of the electron beam into an analog value, and a smoothing circuit for smoothing an analog signal delivered out of said D/A converter, whereby said smoothing circuit provides an output signal serving as said correction waveform.

11. A television camera according to claim 2 wherein said non-linear circuit means comprises an inverting circuit, a plurality of resistance-type potential dividers, and a plurality of diodes respectively connected to voltage division points of said potential dividers.

* * * * *